United States Patent
Goldberg et al.

(10) Patent No.: US 10,496,293 B2
(45) Date of Patent: Dec. 3, 2019

(54) TECHNIQUES FOR SELECTING STORAGE BLOCKS FOR GARBAGE COLLECTION BASED ON LONGEVITY INFORMATION

(71) Applicant: INTERNATIONAL BUSINESS MACHINES CORPORATION, Armonk, NY (US)

(72) Inventors: Itzhack Goldberg, Haifa (IL); Frank Krick, Ockenheim (DE); Heiko H. Schloesser, Tucson, AZ (US); Neil Sondhi, Hungary (EP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/458,684

(22) Filed: Mar. 14, 2017

(65) Prior Publication Data

US 2018/0267720 A1  Sep. 20, 2018

(51) Int. Cl.
*G06F 12/00* (2006.01)
*G06F 3/06* (2006.01)
(Continued)

(52) U.S. Cl.
CPC ............ *G06F 3/0619* (2013.01); *G06F 3/065* (2013.01); *G06F 3/0679* (2013.01);
(Continued)

(58) Field of Classification Search
CPC ...... G06F 3/0619; G06F 3/0679; G06F 3/065; G06F 2212/7201; G06F 2212/7205; G06F 12/0253; G06F 16/125
See application file for complete search history.

(56) References Cited

U.S. PATENT DOCUMENTS 5,458,595 A * 10/1995 Tadir .................. A61B 1/32
                                                  600/220
5,485,595 A *  1/1996 Assar ................ G06F 3/0601
                                                365/185.11
(Continued)

FOREIGN PATENT DOCUMENTS

WO    2014144384 A1    9/2014
WO    2015109281 A1    7/2015

OTHER PUBLICATIONS

Du, Yi-Mo, et al., "CSWL: Cross-SSD Wear-Leveling Method in SSD-Based RAID Systems for System Endurance and Performance", Journal of Computer Science and Technology 28.1 (2013): 28-41.

(Continued)

*Primary Examiner* — Kalpit Parikh
(74) *Attorney, Agent, or Firm* — Michael R. Long; Wenjie Li

(57) ABSTRACT

A technique for operating a data storage system includes accessing respective absolute expiration times for valid pages in one or more candidate storage blocks. Garbage collection is performed on ones of the candidate storage blocks that include a first predetermined number of the valid pages that do not expire, as indicated by the absolute expiration times, prior to a first predetermined time period. Garbage collection is deferred on ones of the candidate storage blocks that include a second predetermined number of the valid pages that expire, as indicated by the absolute expiration times, prior to a second predetermined time period.

20 Claims, 13 Drawing Sheets

(51) Int. Cl.
*G06F 16/11* (2019.01)
*G06F 12/02* (2006.01)

(52) U.S. Cl.
CPC ........ *G06F 12/0246* (2013.01); *G06F 16/125* (2019.01); *G06F 2212/7201* (2013.01); *G06F 2212/7205* (2013.01)

(56) References Cited

U.S. PATENT DOCUMENTS

| | | |
|---|---|---|
| 2007/0260830 A1 | 11/2007 | Faibish et al. |
| 2011/0161299 A1* | 6/2011 | Prahlad ............. G06F 17/30091 707/649 |
| 2012/0042202 A1 | 2/2012 | Wenzel |
| 2014/0189212 A1 | 7/2014 | Slaight et al. |
| 2015/0006792 A1 | 1/2015 | Lee et al. |
| 2015/0193337 A1 | 7/2015 | Kimmel |
| 2017/0286288 A1* | 10/2017 | Higgins .............. G06F 12/0246 |

OTHER PUBLICATIONS

Wu, Xiaoquan, et al., "RAID-Aware SSD: Improving the Write Performance and Lifespan of SSD in SSD-Based RAID-5 System", Big Data and Cloud Computing (BdCloud), 2014 IEEE Fourth International Conference on. IEEE, 2014.
Chang, Yuan-Hao, et al.,; "Improving flash wear-leveling by proactively moving static data", IEEE Transactions on Computers 59.1 (2010): 53-65.

* cited by examiner

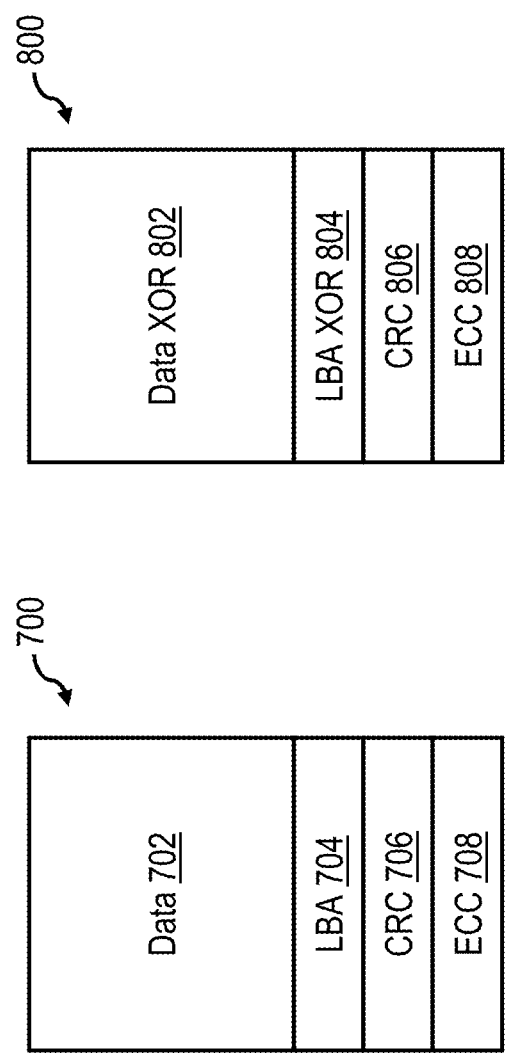

| LBA | Bank | Block | Page | Created | Expires |
|-----|------|-------|------|---------|---------|
| 0 | | | | | |
| 1 | | | | | |

Flash Translation Table 103

| N-1 | | | | | |
| N | | | | | |

Fig. 11

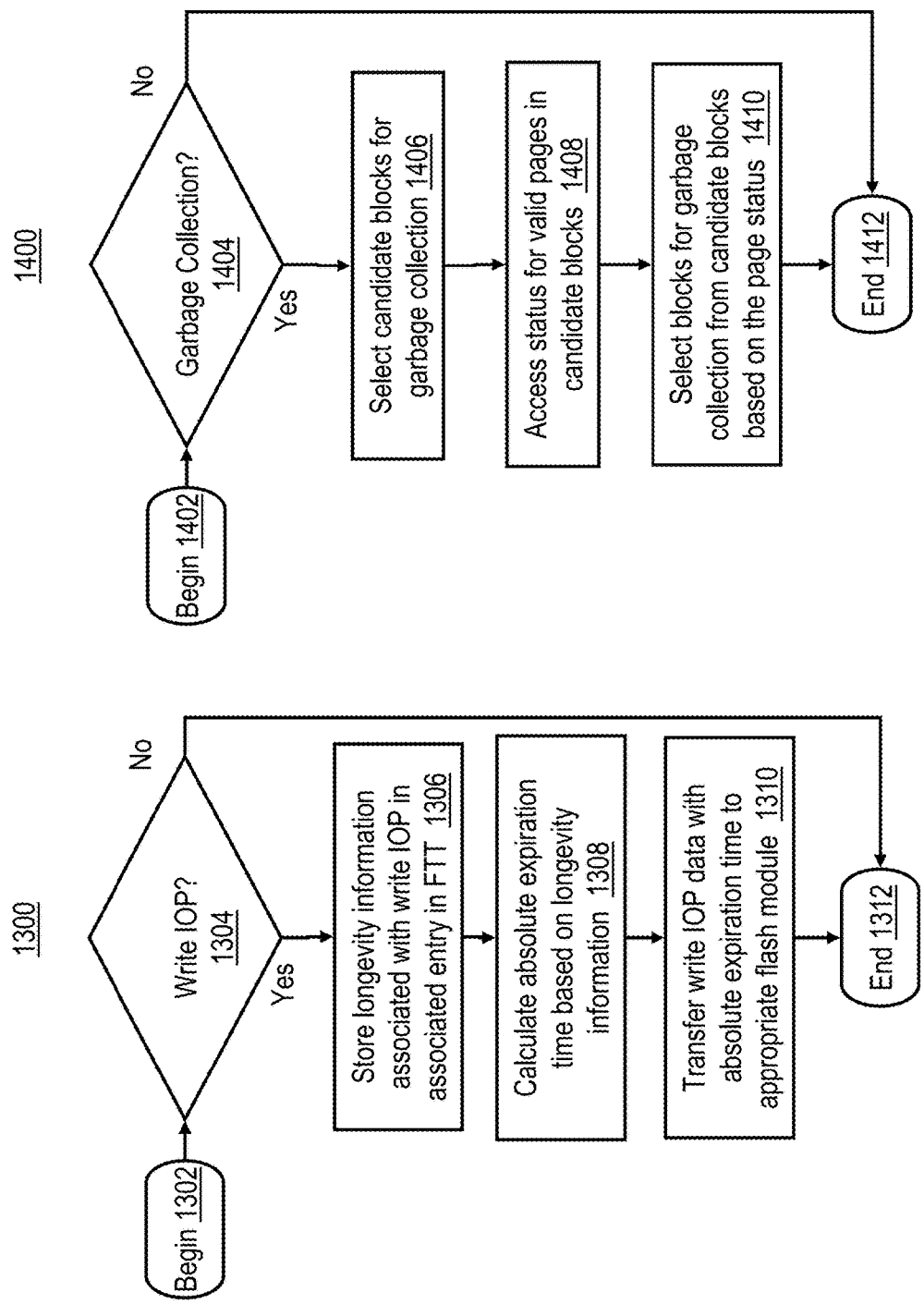

TECHNIQUES FOR SELECTING STORAGE BLOCKS FOR GARBAGE COLLECTION BASED ON LONGEVITY INFORMATION

BACKGROUND OF THE INVENTION

This disclosure relates to data processing and storage, and more specifically, to techniques for selecting storage blocks in a data storage system, such as a flash memory system, for garbage collection based on longevity information.

NAND flash memory is an electrically programmable and erasable non-volatile memory technology that stores one or more bits of data per memory cell as a charge on the floating gate of a transistor or a similar charge trap structure. In a typical implementation, a NAND flash memory array is organized in blocks (also referred to as "erase blocks") of physical memory, each of which includes multiple physical pages each in turn containing a multiplicity of memory cells. By virtue of the arrangement of the word and bit lines utilized to access memory cells, flash memory arrays can generally be programmed on a page basis, but are erased on a block basis.

As is known in the art, blocks of NAND flash memory must be erased prior to being programmed with new data. A block of NAND flash memory cells is erased by applying a high positive erase voltage pulse to the p-well bulk area of the selected block and by biasing to ground all of the word lines of the memory cells to be erased. Application of the erase pulse promotes tunneling of electrons off of the floating gates of the memory cells biased to ground to give them a net positive charge and thus transition the voltage thresholds of the memory cells toward the erased state. Each erase pulse is generally followed by an erase verify operation that reads the erase block to determine whether the erase operation was successful, for example, by verifying that less than a threshold number of memory cells in the erase block have been unsuccessfully erased. In general, erase pulses continue to be applied to the erase block until the erase verify operation succeeds or until a predetermined number of erase pulses have been used (i.e., the erase pulse budget is exhausted).

A NAND flash memory cell can be programmed by applying a positive high program voltage to the word line of the memory cell to be programmed and by applying an intermediate pass voltage to the memory cells in the same string in which programming is to be inhibited. Application of the program voltage causes tunneling of electrons onto the floating gate to change its state from an initial erased state to a programmed state having a net negative charge. Following programming, the programmed page is typically read in a read verify operation to ensure that the program operation was successful, for example, by verifying that less than a threshold number of memory cells in the programmed page contain bit errors. In general, program and read verify operations are applied to the page until the read verify operation succeeds or until a predetermined number of programming pulses have been used (i.e., the program pulse budget is exhausted).

A snapshot refers to creating a point-in-time data copy. With snapshot technology an original copy of data continues to be available to applications without interruption, while a snapshot is used to perform other functions on the data. Snapshots may be used by various applications, e.g., data protection, data analysis and reporting, and data replication applications, and facilitate efficient data protection. In general, snapshot technology facilitates improved application availability, faster recovery, easier back-up management of large volumes of data, reduced exposure to data loss, virtual elimination of backup windows, and lower total cost of ownership. Most leading storage hardware and software vendors implement snapshot technology. As one example, advanced data protection solutions such as IBM® Tivoli® Storage Manager implement snapshot technology.

Snapshots are generated to track changing blocks on a storage volume as writes to the storage volume are performed. With copy-on-write technology, original data that is to be overwritten is copied into a designated storage space that is set aside for a snapshot before the original data is overwritten. Typically, read requests to unchanged data blocks are redirected to the copied blocks in the snapshot, while read requests to active data blocks that have been changed are directed to the original storage volume. A snapshot includes metadata that describes changes to data blocks since the snapshot was first created. It should be noted that original data blocks are copied only once into the designated storage space for the snapshot, i.e., when the first write request is received for the original data blocks.

BRIEF SUMMARY

A technique for operating a data storage system includes accessing respective absolute expiration times for valid pages in one or more candidate storage blocks. Garbage collection is performed on ones of the candidate storage blocks that include a first predetermined number of the valid pages that do not expire, as indicated by the absolute expiration times, prior to a first predetermined time period. Garbage collection is deferred on ones of the candidate storage blocks that include a second predetermined number of the valid pages that expire, as indicated by the absolute expiration times, prior to a second predetermined time period.

The disclosed techniques may be implemented as a method, a data storage system, and/or a program product (including program code stored in a storage device).

BRIEF DESCRIPTION OF THE SEVERAL VIEWS OF THE DRAWINGS

FIG. 7 illustrates an exemplary codeword stored in each data page in accordance with the present disclosure;

FIG. 8 depicts an exemplary codeword stored in each data protection page in accordance with the present disclosure;

FIG. 11 depicts a flash translation table (FTT), according to one embodiment of the present disclosure;

FIG. 13 is a high level logical flowchart of an exemplary process implemented by a controller configured in accordance with one embodiment of the present disclosure; and FIG. 14 is a high level logical flowchart of an exemplary garbage collection process for a data storage system in accordance with one embodiment of the present disclosure.

DETAILED DESCRIPTION

Figure 1A:
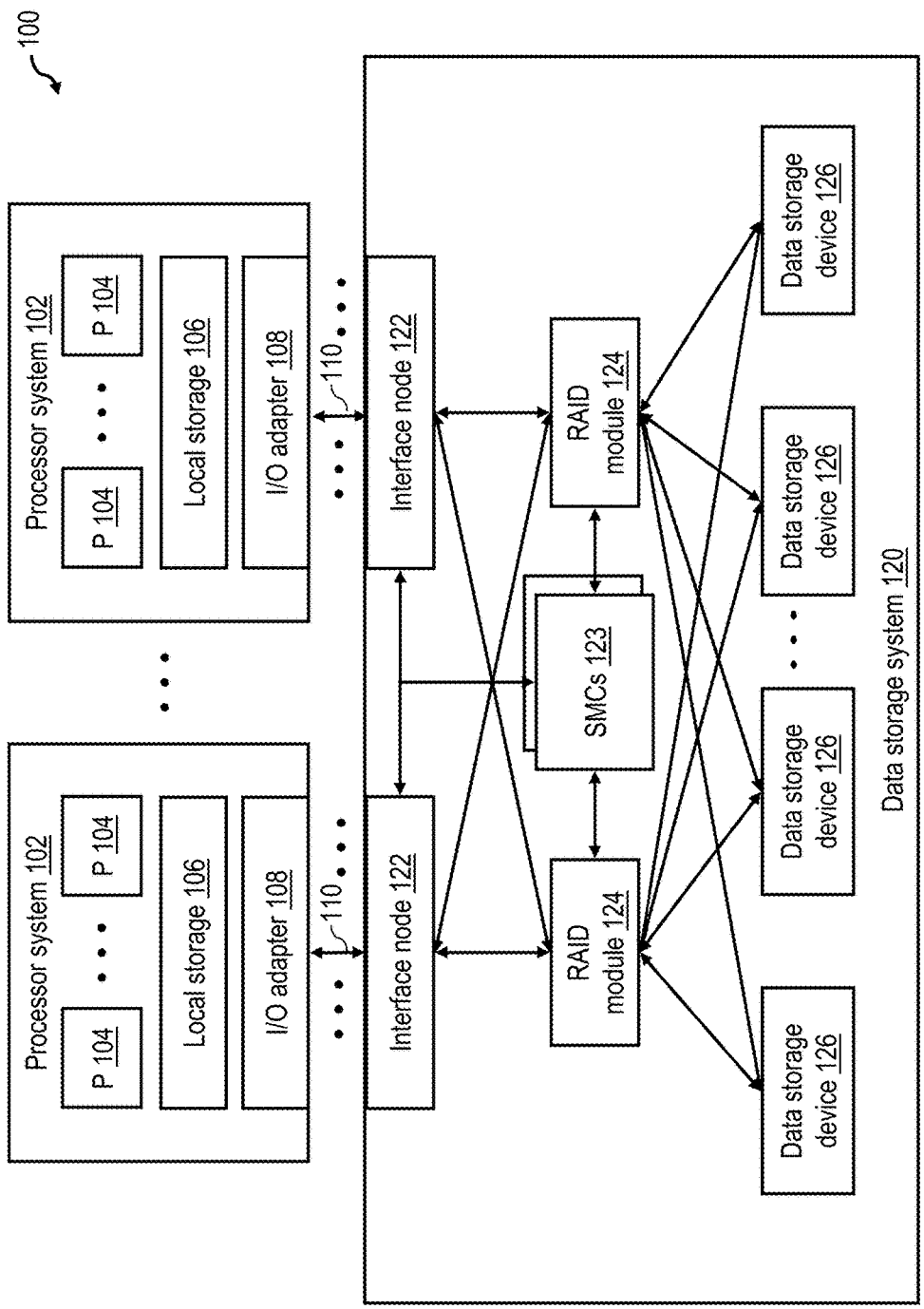
FIG. 1A is a high level block diagram of a data processing environment in accordance with one embodiment.

According to one or more embodiments of the present disclosure, flash memory endurance is generally improved by providing expiration time hints (from a host application) to a flash module, e.g., via a redundant array of inexpensive disks (RAID) module. Implementing expiration time hints facilitates data erasure based on an absolute expiration time, which generally improves garbage collection efficiency (e.g., by reducing write amplification and wear) in that garbage collection of data blocks with a threshold level of valid pages that are soon to be deleted may be deferred. As one example, an 'absolute expiration time' for a data page can be derived from copyservices snapshot metadata that includes a creation time and an expiration time.

Copy-on-write technology is used to create a point-in-time consistent data snapshot. With copy-on-write technology old data is maintained intact and new data is written to a new location with metadata being created that points to the new location. In general, copy-on-write technology (while being more involved programmatically in that copy-on-write technology implements relatively complex metadata structures) minimizes data movement. It should be appreciated that copy-on-write technology is orthogonal to an underlying storage technology and can be implemented with both spindle-based hard disk drives (HDDs) and flash-based storage. As many applications create short-term snapshots (i.e., snapshots that are deleted soon after creation), tracking application snapshot usage for use when making garbage collection decisions may generally lead to decreased wear, as compared to where data storage systems are indifferent to application snapshot usage.

Flash-based data storage systems have conventionally included one or more RAID modules that have facilitated host access to flash memory arrays of the data storage systems via an interface controller. In one or more conventional data storage systems, each RAID module has included a central processing unit (CPU), a memory, a system manager, and a RAID controller. Each RAID controller has conventionally hosted a flash translation driver and accessed a flash translation table (FTT) that is maintained in the memory. The FTT has enabled the storage system to locate and manage physical storage locations in various flash memory arrays. That is, the FTT has provided a translation from a logical block address (LBA) utilized by a host file system to a physical block address (PBA), i.e., a memory bank, block in the memory bank, and page in the block, in flash memory that has stored desired data. Conventionally, the PBA has been passed from the RAID controller to a gateway of the flash module and has been processed by a CPU of the flash module. The gateway has communicated with various flash controllers using a flash memory driver.

In general, each physical flash memory location includes a user area and a spare area. The spare area is an unused space in the flash memory that provides additional storage space that may be utilized in the event that user area space becomes defective. The spare area space may also be used by the flash controller to maintain a status for an associated page. The status for a page has conventionally indicated whether the page is 'live', 'dead', or 'free'. A 'live' status has indicated the page holds valid data that is in use and has to be moved by a garbage collector when a block that includes the page is garbage collected. A 'dead' status has indicated that the page is either not valid from a host perspective or that the page is defective or worn-out and the page does not need to be copied/moved when a block that includes the page is garbage collected. A 'free' status has indicated the page is free and can be used by the garbage collector, e.g., to maintain fragmented storage spaces with used data pages and free-up the blocks of the fragmented storage spaces for a new round of writes.

In general, garbage collectors copy valid data from a block that is to be erased to a new block and, as such, garbage collection reduces flash storage cell lifetime due to write amplification. According to the present disclosure, a garbage collector is configured to reduce wear of flash storage cells by considering respective lifetimes of valid pages in a block (i.e., whether valid pages in a block are expected to be deleted shortly and, as such, do not require copying to a new block if garbage collection is deferred to a later garbage collection window) when selecting blocks for garbage collection.

A process for deleting a file via a host interface to a data storage system has conventionally been initiated when a host receives a request (e.g., from an application) to delete the file. To delete a file, a host has conventionally sent a storage command to a RAID module of the data storage system requesting that the file be deleted. Upon receiving the file delete request, a RAID module has conventionally created a file delete marker for the file that has been passed to a flash module, which has deleted the file (e.g., by updating a status of a page or pages associated with the file with a status of 'dead', such that when a block that includes the dead pages is erased the dead pages are not copied to a new block) in response to receipt of the file delete marker.

Conventionally, independent snapshots could be deleted via a system management interface in parallel with file deletion via the host interface. A conventional process for deleting a snapshot has been initiated when a system manager determines that the snapshot should be deleted (e.g., when an application indicates that the snapshot is no longer needed and should be deleted). A request to delete the snapshot has conventionally been sent by an application to a system manager of an appropriate RAID module via a management network. Upon receiving the snapshot deletion request, the system manager of the RAID module has conventionally marked the snapshot for deletion and notified, via the RAID controller, the flash module that the snapshot required deletion. The flash module has then conventionally deleted the snapshot (e.g., by updating a status of a page or pages associated with the snapshot with a status of 'dead', such that when a block that includes the dead pages is erased the dead pages are not copied to a new block).

Conventionally, the flash module has then removed data blocks marked for deletion using a scrubbing thread (i.e., garbage collector). In general, a garbage collector has located the best candidate blocks for erasure based on an implemented garbage collection process. As previously mentioned, in a block that is to be erased all valid data pages have to be copied to another block before the block can then be erased to make space available for new writes (at a page granularity) to the block. In a usual case, when available space on a flash module is below a desired threshold, a garbage collector attempts to locate data blocks that host only a few active/valid/current pages of data for garbage collection. The garbage collector first moves the valid pages of data in a selected block to a new location and then erases the selected block to increase the available space on the flash module. In general, copying data internally by flash firmware increases write-amplification, I/O latency, and flash wear. It should be appreciated that if a copied page is deleted soon after the page was copied to a new block, deletion of the recently copied page results in inefficient use of the limited number of erasures to which blocks of a flash memory may be subjected and causes wear that may have been avoided. As such, according to the present disclosure, situations where data is moved to a new storage location only to be deleted (from a host perspective) soon after being moved to the new storage location are avoided.

In many cases, applications executing on a host have reliable information on how long data created by the applications are needed. Providing a flash module with page lifetime hints allows a flash module to make better decisions as to which blocks to target for garbage collection. According to aspects of the present disclosure, a behavioral file-delete-forecast is created that can be used by a flash controller when making decisions as to which block to target for erasure. As one example, implementing an absolute expiration time field allows a garbage collector to make better decisions as to when a given block should be garbage collected. In this manner, the garbage collector may avoid selecting blocks for erasure that include data that will be deleted in the near future. Avoiding copying data that will be deleted in the near future generally reduces write wear on flash storage cells and improves the lifetime of a flash storage system. According to the present disclosure, a file to be deleted can be a snapshot or any file that is deleted by an application executing on a host. In one or more embodiments, in an effort to increase storage cell lifetime a conventional flash translation table is extended with a snapshot creation field and an expiration field. A process can then be implemented that utilizes values in the creation and expiration fields to generate an 'absolute expiration time', which is then copied to a page status.

Other characteristics and classifications of storage data may also be used to reduce write accesses. One known classification distinguishes between hot data (i.e., data that is accessed often and as such belongs with a higher performing storage array) and cold data (i.e., data that is rarely touched and as such can reside on the less expensive media). Using similar techniques to classify these data can help the management layer advise the flash layer of a pending move of data from the flash to a cheaper media. In doing so, write amplification can be minimized using hints associated with snapshots that are communicated by an application to a storage array.

With reference to the figures and with particular reference to FIG. 1A, there is illustrated a high level block diagram of an exemplary data processing environment 100 including a data storage system 120 having a non-volatile memory array as described further herein. As shown, data processing environment 100 includes one or more hosts, such as a processor system 102 having one or more processors 104 that process instructions and data, e.g., application instructions and data. Processor system 102 may additionally include local storage 106 (e.g., dynamic random access memory (DRAM) or disks) that may store program code, operands and/or execution results of the processing performed by processor(s) 104. In various embodiments, processor system 102 can be, for example, a mobile computing device (such as a smartphone or a tablet), a laptop or a desktop personal computer system, a server computer system (such as one of the POWER series of servers available from International Business Machines Corporation), or a mainframe computer system. Processor system 102 can also be an embedded processor system using various processors such as ARM, POWER, Intel x86, or any other processor combined with memory caches, memory controllers, local storage, I/O bus hubs, etc.

Each processor system 102 further includes an input/output (I/O) adapter 108 that is coupled directly (i.e., without any intervening device) or indirectly (i.e., through at least one intermediate device) to a data storage system 120 via an I/O channel 110. In various embodiments, an I/O channel 110 may employ any one or a combination of known or future developed communication protocols, including, for example, Fibre Channel (FC), FC over Ethernet (FCoE), Internet Small Computer System Interface (iSCSI), Infini-Band, Transport Control Protocol/Internet Protocol (TCP/IP), Peripheral Component Interconnect Express (PCIe), etc. I/O operations (IOPs) communicated via I/O channel 110 include read IOPs by which a processor system 102 requests data from data storage system 120 and write IOPs by which a processor system 102 requests storage of data in data storage system 120.

Although not required to be separate, in the illustrated embodiment, data storage system 120 includes multiple interface cards 122 through which data storage system 120 receives and responds to input/output operations (IOPs) 102 via I/O channels 110. Each interface card 122 is coupled to each of multiple Redundant Array of Inexpensive Disks (RAID) controllers 124 in order to facilitate fault tolerance and load balancing. Each of RAID controllers 124 is in turn coupled (e.g., by a PCIe bus) to each of multiple data storage devices 126 including, for example, NAND flash cards and/or HDDs and/or other alternative or additional non-volatile storage devices.

In the depicted embodiment, the operation of data storage system 120 is managed by redundant system management controllers (SMCs) 123, which are coupled to interface cards 122 and RAID controllers 124. In various embodiments, each system management controller 123 can be implemented utilizing hardware or hardware executing firmware and/or software. It should be appreciated that some or all of the functionality of interface card 122 and SMC 123 may be implemented within each RAID module 124.

Figure 1B:
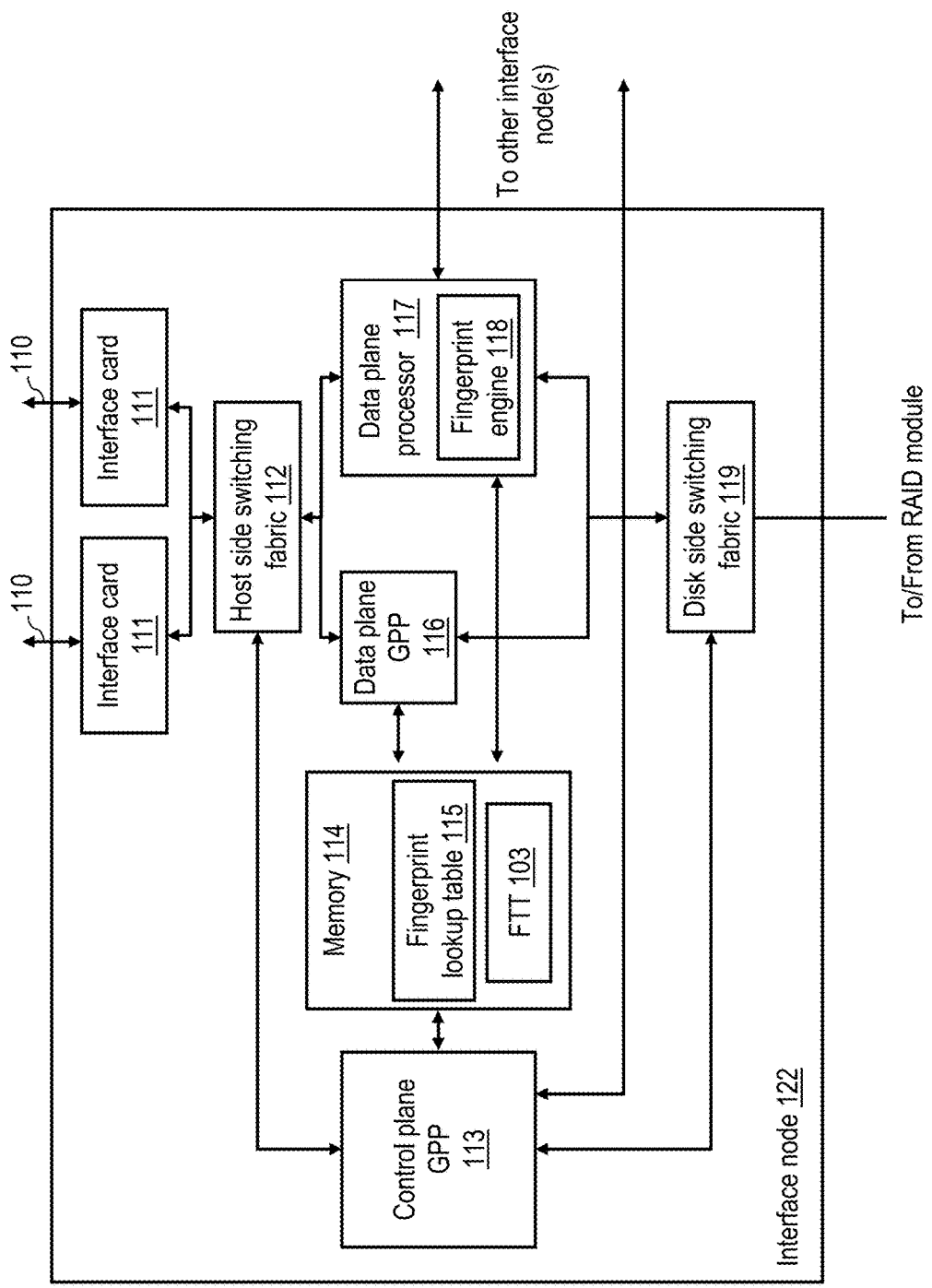
FIG. 1B is a more detailed block diagram of an exemplary interface node of the data storage system of FIG. 1A.

FIG. 1B depicts a more detailed block diagram of an interface node 122 of data storage system 120 of FIG. 1A. Interface node 122 includes one or more interface cards 111 that serve as an interface to processor systems 102 through I/O channels 110 and connect to host side switching fabric 112. The host side switching fabric 112 acts as a switch and handles all data transfers between interface cards 111 and processing units in interface node 122, namely control plane general purpose processor (GPP) 113, data plane GPP 116, and data plane processor 117. Typically, host side switching fabric 112 consist of a PCIe switch, but other switch technologies may be used as well. Data plane processor 117 is a special purpose processor that can be implemented, for example, by an Application Specific Integrated Circuit (ASIC) or a Field Programmable Gate Array (FPGA)). Control plane GPP 113, data plane GPP 116, and data plane processor 117 are all connected to memory 114 which may be implemented as a shared memory between these components, separate memories, or a combination thereof.

Data plane processor 117 is illustrated as implementing a fingerprint engine 118 that generates fingerprints for received data pages that are to be written to or read from Flash modules 126A. Data plane processor 117 may further access a fingerprint lookup table (LUT) 115 stored in memory 114 either directly or by communicating with data plane GPP 116 or control plane GPP 113. Fingerprints for received data pages may include hashes, CRCs, or a combination of hashes and CRCs. Fingerprint engine 118 (or other logic in data plane processor 117) may also be configured to determine compressed page sizes of received data pages. Fingerprint LUT 115 stores fingerprints for data pages that are stored in Flash modules 126A. It should be appreciated that fingerprint LUT 115 may, at any given time, only store fingerprints for some of the data pages stored in Flash modules 126A due to memory size limitations.

In embodiments in which data plane processor 117 is implemented with an FPGA, control plane GPP 113 may program and configure data plane processor 117 during start-up of data storage system 120. Data plane GPP 116 and control plane GPP 113 control data plane processor 117 as well as access to Flash modules 126A either indirectly through the control of data plane processor 117 or directly through disk side switching fabric 119. Control plane GPP 113 executes system management functions as well as higher level services such as snapshots, thin provisioning, and deduplication. Data plane GPP 116 executes protocol specific functions. Control plane GPP 113, data plane GPP 116, and data plane processor 117 are connected to RAID module 124 through disk side switching fabric 119 which typically consist of a PCIe switch, but other switch technologies may be used as well. FIG. 1B further illustrates control plane GPP 113 and data plane processor 117 being connected to other interface nodes 122 in data storage system 120 to handle fail-over scenarios or for performing other data synchronization functions. In one or more embodiments, data plane processor 117 is further configured to access a flash translation table (FTT) 103 stored in memory 114 either directly or by communicating with data plane GPP 116 or control plane GPP 113. As is discussed in further detail below (see FIG. 11), according to an embodiment of the present disclosure, FTT 103 is configured to store a value in a 'created' field and another value in an 'expires' field for each page that is referenced in FTT 103. In one or more embodiments, FTT 103 facilitates translations from a logical block address (LBA) to a physical block address (PBA) for each referenced page. It should be appreciated that FTT 103 may be implemented at a different level of data storage system 120, e.g., within Flash module 126A.

Figure 1C:
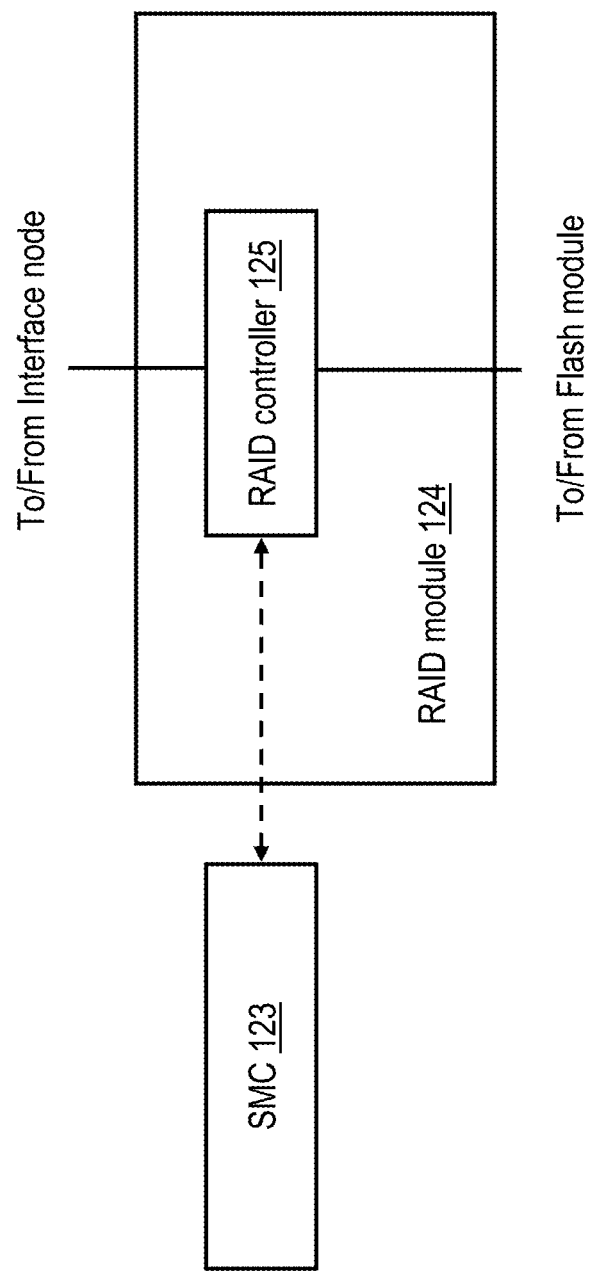
FIG. 1C is a more detailed block diagram of an exemplary redundant array of inexpensive disks (RAID) module of the data storage system of FIG. 1A.

FIG. 1C further depicts an interconnection of RAID controller 125 of RAID module 124 of data storage system 120 of FIG. 1A with SMC 123. It should be appreciated that functionality provided by SMC 123 and interface card 122 may be included within each RAID module 124.

Figure 1D:
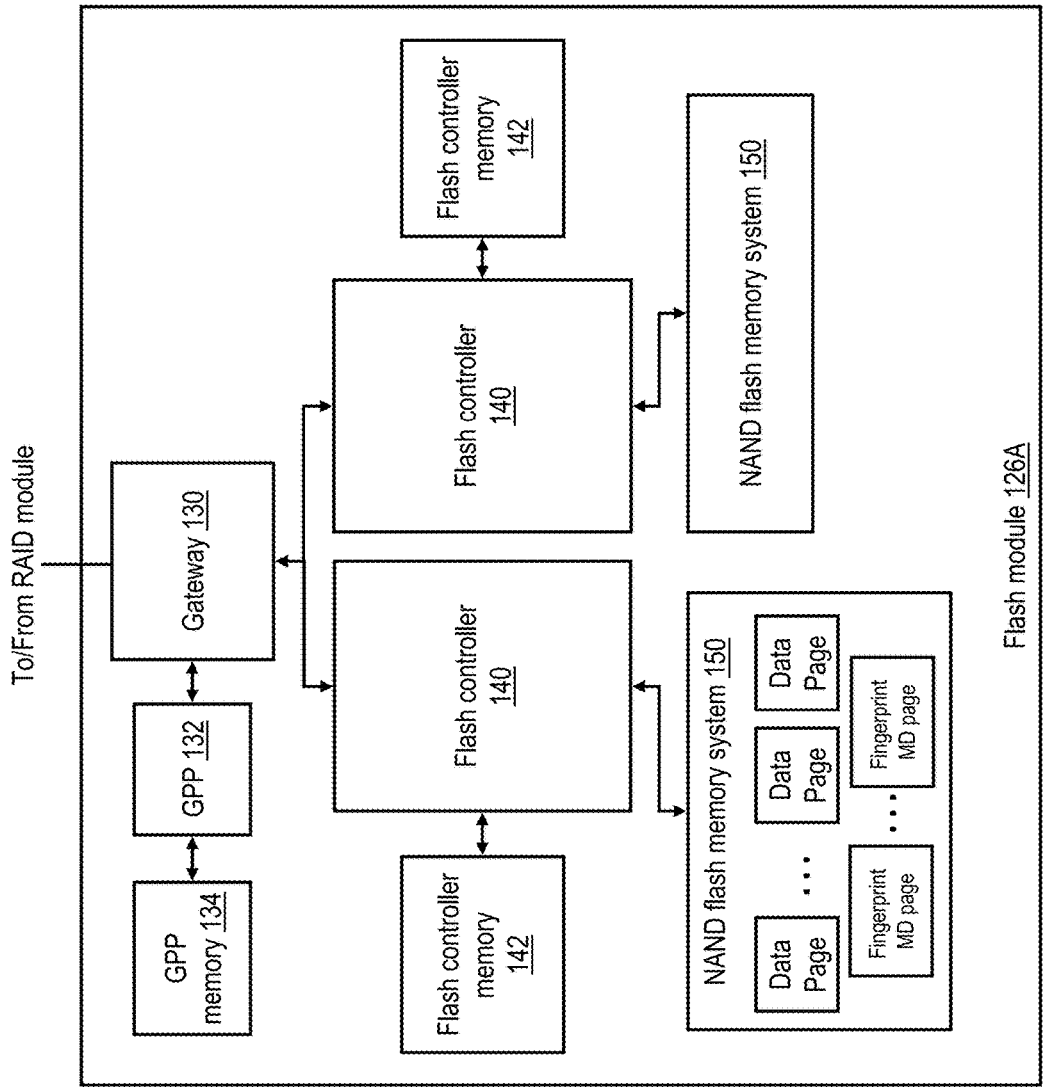
FIG. 1D is a more detailed block diagram of an exemplary flash module of the data storage system of FIG. 1A.

FIG. 1D depicts a more detailed block diagram of a Flash module 126A of data storage system 120 of FIG. 1A. Flash module 126A includes a gateway 130 that serves as an interface between Flash module 126A and RAID modules 124. Gateway 130 is coupled to a general-purpose processor (GPP) 132, which can be configured (e.g., by program code) to perform various management functions, such as pre-processing of IOPs received by gateway 130 and/or to schedule servicing of the IOPs by Flash module 126A. GPP 132 is coupled to a GPP memory 134 (e.g., Dynamic Random Access Memory (DRAM) or Magneto-resistive Random Access Memory (MRAM)) that can conveniently buffer data created, referenced and/or modified by GPP 132 in the course of its processing.

Gateway 130 is further coupled to multiple flash controllers 140, each of which controls a respective NAND flash memory system 150. Flash controllers 140 can be implemented, for example, by an Application Specific Integrated Circuit (ASIC) or a Field Programmable Gate Array (FPGA)) having an associated flash controller memory 142 (e.g., DRAM). In embodiments in which flash controllers 140 are implemented with an FPGA, GPP 132 may program and configure flash controllers 140 during start-up of data storage system 120. After startup, in general operation flash controllers 140 receive read and write IOPs from gateway 130 that request to read data stored in NAND flash memory system 150 and/or to store data in NAND flash memory system 150. Flash controllers 140 service these IOPs, for example, by accessing NAND flash memory systems 150 to read or write the requested data from or into NAND flash memory systems 150 or by accessing one or more read and/or write caches (not illustrated in FIG. 1D) associated with NAND flash memory systems 150. For example, NAND flash memory systems 150 may store a combination of data pages and one or more fingerprint metadata (MD) pages that provide fingerprint metadata for one or more data pages. In an alternative embodiment, fingerprint MD may be stored in a different memory than data pages.

Data storage system 120 may implement a Flash Translation Layer (FTL) at various levels. For example, flash controllers 140 may implement an FTL that provides logical-to-physical address translation to enable access to specific memory locations within NAND flash memory systems 150. In general, an IOP received by data storage system 120 from a host device, such as a processor system 102, contains the logical block address (LBA) at which the data is to be accessed (read or written) and, if a write IOP, the write data to be written to data storage system 120. The IOP may also specify the amount (or size) of the data to be accessed. Other information may also be communicated depending on the protocol and features supported by data storage system 120. As is known to those skilled in the art, NAND flash memory, such as that employed in NAND flash memory systems 150, is constrained by its construction such that the smallest granule of data that can be accessed by a read or write IOP is fixed at the size of a single flash memory page, for example, 16 kilobytes (kB). The LBA provided by the host device corresponds to a logical page within a logical address space, the logical page typically having a size of four (4) kilobytes. As such, more than one logical page may be stored in a physical flash page. The FTL translates this LBA into a physical address assigned to a corresponding physical location in a NAND flash memory system 150.

Flash controllers 140 may perform address translation and/or store mappings between logical and physical addresses in a logical-to-physical translation data structure, such as a logical-to-physical translation (LPT) table, which may conveniently be stored in flash controller memory 142. An LPT table may also be configured to store compressed page sizes of data pages stored in NAND flash memory system 150 and even further their CRC values. According to aspects of the present disclosure, the compressed page sizes of stored data pages may be utilized in a determination of whether a received data page has a same size as a stored data page and is, thus, a candidate duplicate data page.

NAND flash memory systems 150 may take many forms in various embodiments. Referring now to FIGS. 2-5, there is depicted one exemplary arrangement of physical memory within a NAND flash memory system 150 in accordance with one exemplary embodiment.

Figure 2:
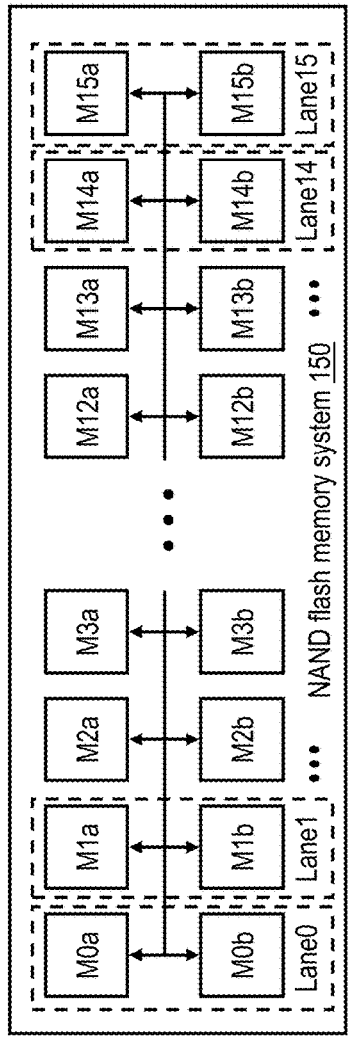
FIGS. 2-5 illustrate an exemplary arrangement of physical memory within a NAND flash memory system in accordance with the present disclosure.

As shown in FIG. 2, NAND flash memory system 150 may be formed from thirty-two (32) individually addressable NAND flash memory storage devices. In the illustrated example, each of the flash memory storage devices M0a-M15b takes the form of a board-mounted flash memory module capable of storing two or more bits per cell. Thus, flash memory modules may be implemented with Single Level Cell (SLC), Multi-Level Cell (MLC), Three Level Cell (TLC), or Quad Level Cell (QLC) memory. The thirty-two NAND flash memory modules are arranged in sixteen groups of two, (M0a, M0b) through (M15a, M15b). For purposes of the physical addressing scheme, each group of two modules forms a "lane," also sometimes referred to as a "channel," such that NAND flash memory system 150 includes sixteen channels or lanes (Lane0-Lane15).

In one embodiment, each of the individual lanes has a respective associated bus coupling it to the associated flash controller 140. Thus, by directing its communications to one of the specific communication buses, flash controller 140 can direct its communications to one of the lanes of memory modules. Because each communication bus for a given lane is independent of the communication buses for the other lanes, a flash controller 140 can issue commands and send or receive data across the various communication buses at the same time, enabling the flash controller 140 to access the flash memory modules corresponding to the individual lanes at, or very nearly at, the same time.

Figure 3:
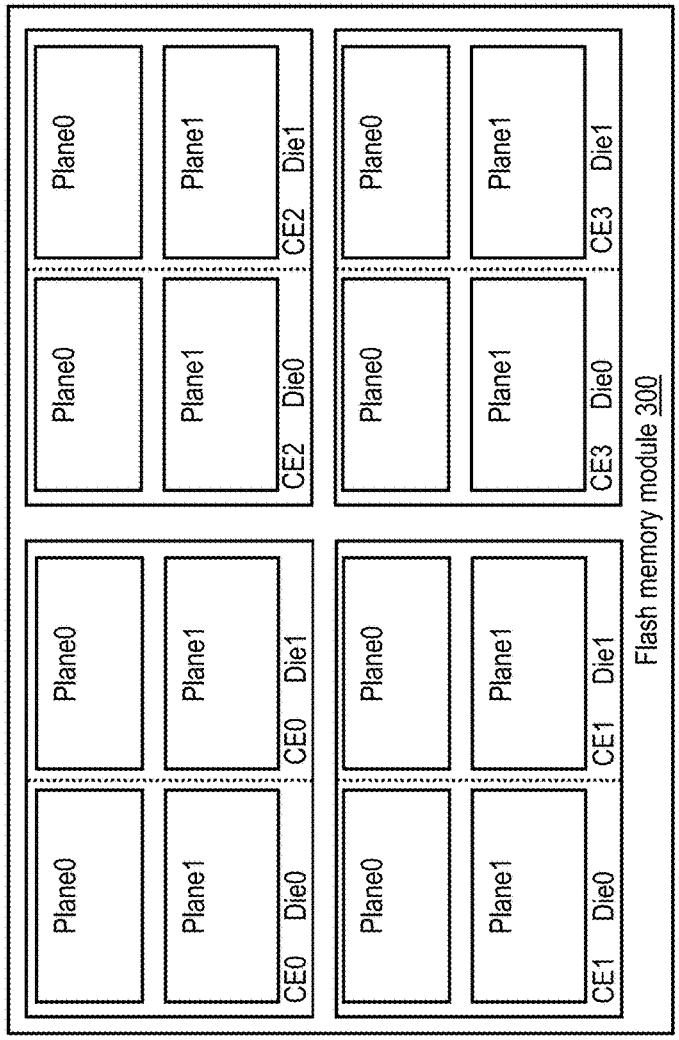

With reference now to FIG. 3, there is illustrated an exemplary embodiment of a flash memory module 300 that can be utilized to implement any of flash memory modules M0a-M15b of FIG. 2. As shown in FIG. 3, the physical storage locations provided by flash memory module 300 are further subdivided into physical locations that can be addressed and/or identified through Chip Enables (CEs). In the example of FIG. 3, the physical memory of each flash memory chip 300 is divided into four Chip Enables (CE0, CE1, CE2 and CE3), each having a respective CE line that is asserted by flash controller 140 to enable access to or from the physical memory locations within the corresponding CE. Each CE is in turn subdivided into multiple dice (e.g., Die0 and Die1) each having two planes (e.g., Plane0 and Plane1). Each plane represents a collection of blocks (described below) that, because of the physical layout of the flash memory chips, are physically associated with one another and that utilize common circuitry (e.g., I/O buffers) for the performance of various operations, such as read and write operations.

Figure 4:
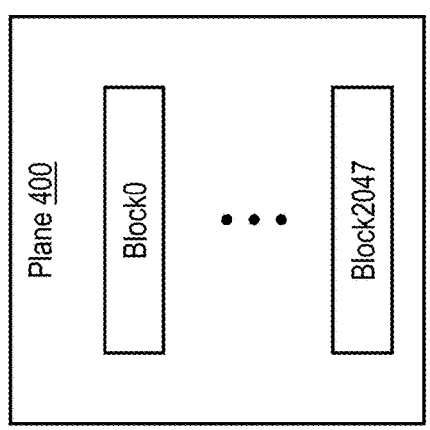
Figure 5:
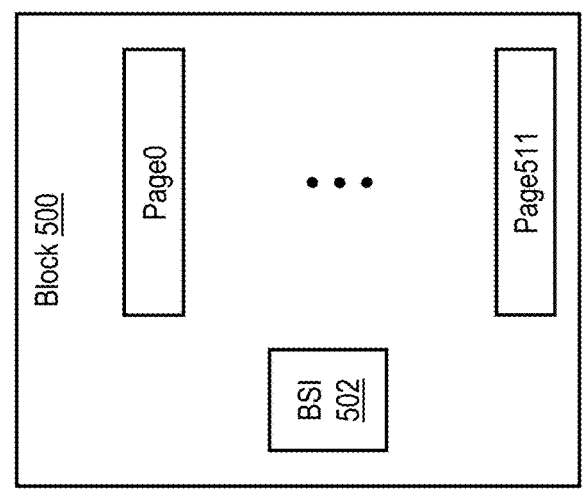

As further shown in FIGS. 4-5, an exemplary plane 400, which can be utilized to implement any of the planes within flash memory module 300 of FIG. 3, includes, for example, 1024 or 2048 blocks of physical memory. Note that manufacturers often add some additional blocks as some blocks might fail early. In general, a block is a collection of physical pages that are associated with one another, typically in a physical manner. This association is such that a block is defined to be the smallest granularity of physical storage locations that can be erased within NAND flash memory system 150. In the embodiment of FIG. 5, each block 500 includes, for example, 256 or 512 physical pages, where a physical page is defined to be the smallest individually addressable data unit for read and write access. In the exemplary system, each physical page of data has a common capacity (e.g., 16 kB) for data storage plus additional storage for metadata described in more detail below. Thus, data is written into or read from NAND flash memory system 150 on a page-by-page basis, but erased on a block-by-block basis.

If NAND flash memory system 150 is implemented in a memory technology supporting multiple bits per cell, it is common for multiple physical pages of each block 500 to be implemented in the same set of memory cells. For example, assuming 512 physical pages per block 500 as shown in FIG. 5 and two bits per memory cell (i.e., NAND flash memory 150 is implemented in MLC memory), Page0 through Page255 (the lower pages) can be implemented utilizing the first bit of a given set of memory cells and Page256 through Page511 (the upper pages) can be implemented utilizing the second bit of the given set of memory cells. The actual order of lower and upper pages may be interleaved and depends on the manufacturer. In many cases, the endurance of pages within a block 500 vary widely, and in some cases, this variation is particularly pronounced between lower pages (which may generally have a lower endurance) and upper pages (which may generally have a greater endurance).

As further shown in FIG. 5, each block 500 preferably includes block status information (BSI) 502, which indicates the status of each physical page in that block 500 as retired (i.e., no longer used to store user data) or non-retired (i.e., active or still usable to store user data). In various implementations, BSI 502 can be collected into a single data structure (e.g., a vector or table) within block 500, distributed within block 500 (e.g., as one or more bits of metadata appended to each physical page) and/or maintained elsewhere in data storage system 120. As one example, in the embodiment illustrated in FIG. 9 and discussed further below, the page status information of all blocks 500 in a NAND flash memory system 150 is collected in a system-level data structure, for example, a page status table (PST) 946 stored in GPP memory 134 or a flash controller memory 142. In various embodiments, the page status stored in PST 946 may include an absolute expiration time for each page.

Because the FTL implemented by data storage system 120 isolates the logical address space made available to host devices from the physical memory within NAND flash memory system 150, the size of NAND flash memory system 150 need not be equal to the size of the logical address space presented to host devices. In most embodiments it is beneficial to present a logical address space that is less than the total available physical memory (i.e., to over-provision NAND flash memory system 150). Overprovisioning in this manner ensures that physical memory resources are available when the logical address space is fully utilized, even given the presence of a certain amount of invalid data as described above. In addition to invalid data that has not yet been reclaimed the overprovisioned space can be used to ensure there is enough logical space, even given the presence of memory failures and the memory overhead entailed by the use of data protection schemes, such as Error Correcting Code (ECC), Cyclic Redundancy Check (CRC), and parity.

Figure 6A:
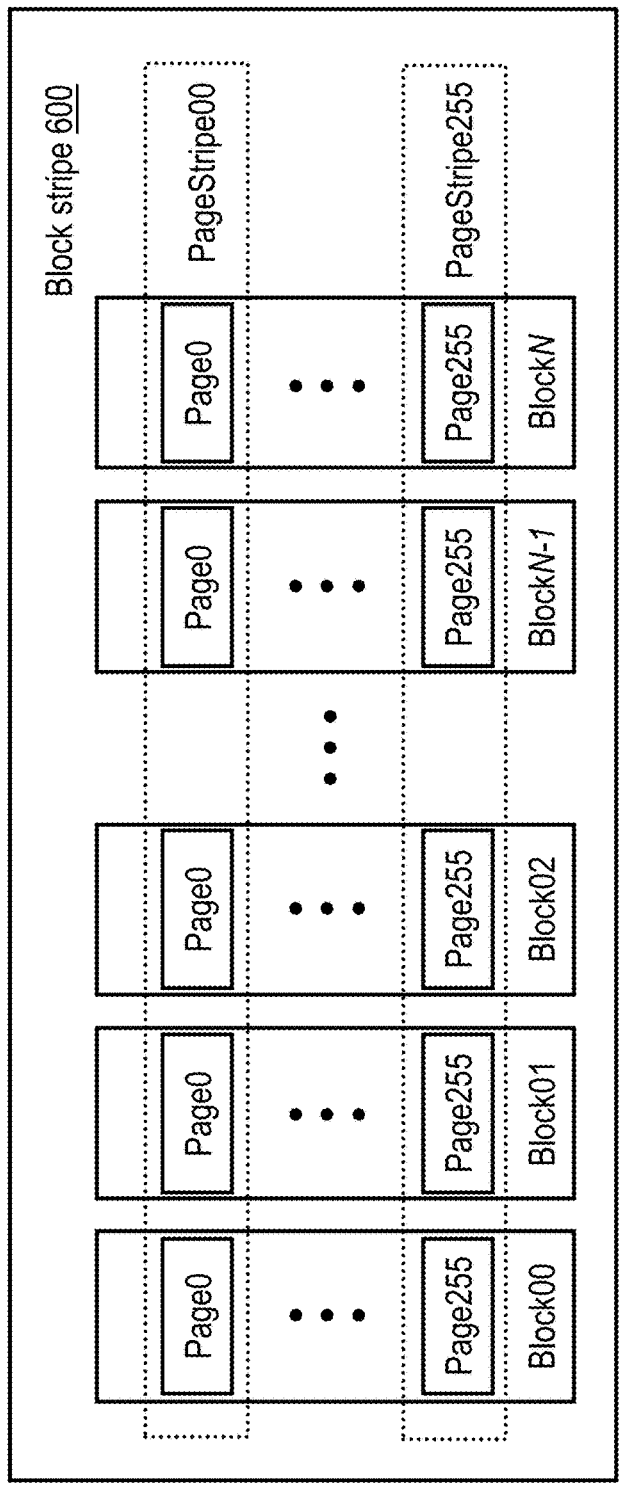
FIG. 6A depicts an exemplary implementation of a block stripe in accordance with the present disclosure.

In some embodiments, data is written to NAND flash memory system 150 one physical page at a time. In other embodiments in which more robust error recovery is desired, data is written to groups of associated physical pages of NAND flash memory system 150 referred to herein as "page stripes." In a disclosed embodiment, all pages of a page stripe are associated with different lanes to achieve high write bandwidth. Because in many implementations the smallest erase unit is a block, page stripes can be grouped into a block stripe as is shown in FIG. 6A, where each block in the block stripe is associated with a different lane. When a block stripe is built, any free block of a lane can be chosen, but preferably all blocks within the same block stripe have the same or similar health grade. Note that the block selection can be further restricted to be from the same plane, die, and/or chip enable. The lengths of the block stripes can and preferably do vary, but in one embodiment in which NAND flash memory system 150 includes 16 lanes, each block stripe includes between two and sixteen blocks, with each block coming from a different lane. Further details regarding the construction of block stripes of varying lengths can be found in U.S. Pat. Nos. 8,176,284; 8,176,360; 8,443,136; and 8,631,273, which are incorporated herein by reference in their entireties.

Figure 6B:
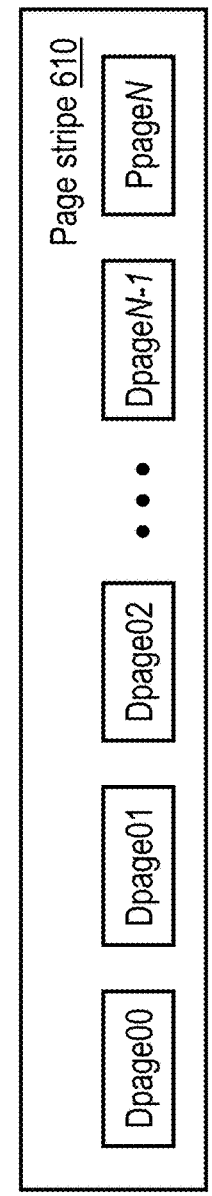
FIG. 6B depicts an exemplary implementation of a page stripe in accordance with the present disclosure.

Once a block from each lane has been selected and a block stripe is formed, page stripes are preferably formed from physical pages with the same page number from all blocks in the block stripe. While the lengths of the various page stripes stored into NAND flash memory system 150 can and preferably do vary, in one embodiment each page stripe includes one to fifteen data pages of write data (typically provided by a host device) and one additional page (a "data protection page") used to store data protection information for the write data. For example, FIG. 6B illustrates an exemplary page stripe 610 including N data pages (i.e., Dpage00 through DpageN−1) and one data protection page (i.e., PpageN). The data protection page can be placed on any lane of the page stripe containing a non-retired page, but typically is on the same lane for all page stripes of the same block stripe to minimize metadata information. The addition of a data protection page as illustrated requires that garbage collection be performed for all page stripes of the same block stripe at the same time. After garbage collection of the block stripe completes, the block stripe can be dissolved, and each block can be placed into the relevant ready-to-use (RTU) queue as explained below. Similarly to logical data pages that are being placed into page stripes of a block stripe, fingerprint MD pages may be placed there as well. Logical data pages and fingerprint MD pages may be intermingled. In fact, Flash module 126A may actually not know the difference between regular logical data pages and fingerprint MD pages. The fingerprint MD pages may be stored on a dedicated metadata volume controlled by the interface nodes 122 and not visible to the processor system 102. As the Flash modules 126A have no notion of volumes, fingerprint MD page operations are handled as regular read and write operations.

FIG. 7 illustrates an exemplary format of a codeword stored in each data page within page stripe 610 of FIG. 6B. Typically, a positive integer number of codewords, for example, 2 or 3, are stored in each data page, but an alternative embodiment may also store a single codeword in a data page. In this example, each codeword 700 includes a data field 702, as well as additional fields for metadata describing the data page. Depending on the size of the codeword, the data field 702 holds data for one or more logical pages. In another embodiment it may also hold fractions of data of logical data pages. In the illustrated example, metadata fields include an LBA field 704 containing the LBAs stored in codeword 700, a CRC field 706 containing the CRC value computed for the combination of data field 702 and LBA field 704, and an ECC field 708 containing an ECC value calculated, in the illustrated example, from a combination of contents of data field 702, LBA field 704, and CRC field 706. In case data field 702 holds fractions of logical data pages, LBA field 704 further holds information on which fractions of logical data pages are stored in data field 702.

FIG. 8 depicts an exemplary format of a codeword in the data protection page of page stripe 610 of FIG. 6. In one embodiment, each data protection page stores a positive integer number of codewords, but an alternative embodiment a data protection page may store a single codeword. In the depicted example, data protection codeword 800 includes a data XOR field 802 that contains the bit-by-bit Exclusive OR (XOR) of the contents of the data fields 702 of the codewords 700 in page stripe 610. Data protection codeword 800 further includes an LBA XOR field 804 that contains the bit-by-bit XOR of LBA fields 704 of codewords 700 in page stripe 610. Data protection codeword 800 finally includes a CRC field 806 and ECC field 808 for respectively storing a CRC value and an ECC value for data protection codeword 800. Such a protection scheme is commonly referred to as RAID 5, since the parity field will not always be located on one particular flash plane. However, it should be appreciated that alternate data protection schemes such as Reed-Solomon can alternatively or additionally be used.

The formats for data pages and data protection pages described above protect data stored in a page stripe using multiple different data protection mechanisms. First, the use of the ECC bits in each data codeword of a data page allows the correction of some number of bit errors within the codeword in a flash page. Depending on the ECC method used it may be possible to correct hundreds of bits or even thousands of bits within a NAND flash page. After ECC checking and correction is performed, the corrected CRC field is used to validate the corrected data. Used together, these two mechanisms allow for the correction of relatively benign errors and the detection of more serious errors using only local intra-page information. Should an uncorrectable error occur in a data page, for example, due to failure of the physical page utilized to store the data page, the contents of the data field and LBA field of the failing data page may be reconstructed from the other data pages and the data protection page for the page stripe.

While the physical memory locations in which the data pages and data protection page of a page stripe will vary within NAND flash memory system 150, in one embodiment the data pages and data protection page that comprise a given page stripe are preferably stored in physical memory locations selected to optimize the overall operation of the data storage system 120. For example, in some embodiments, the data pages and data protection page comprising a page stripe are stored such that different physical lanes are employed to store each of the data pages and data protection page. Such embodiments support efficient access to a page stripe because flash controller 140 can access all of the pages of data that comprise the page stripe simultaneously or nearly simultaneously. It should be noted that the assignment of pages to lanes need not be sequential (i.e., data pages can be stored in any lane in any order), and unless a page stripe is a full length page stripe (e.g., containing fifteen data pages and one data protection page), the lanes utilized to store the page stripe need not be adjacent.

Having described the general physical structure and operation of one exemplary embodiment of a data storage system 120, certain operational aspects of data storage system 120 are now described with reference to FIG. 9, which is a high level flow diagram of the flash management functions and data structures employed by GPP 132 and/or flash controllers 140 in accordance with one embodiment.

As noted above, data storage system 120 does not generally allow external devices to directly address and/or access the physical memory locations within NAND flash memory systems 150. Instead, data storage system 120 is generally configured to present a single contiguous logical address space to the external devices, thus allowing host devices to read and write data to and from LBAs within the logical address space while permitting flash controllers 140 and GPP 132 to control where the data that is associated with the various LBAs actually resides in the physical memory locations comprising NAND flash memory systems 150. In this manner, performance and longevity of NAND flash memory systems 150 can be intelligently managed and optimized. In the illustrated embodiment, each flash controller 140 manages the logical-to-physical translation using a logical-to-physical translation data structure, such as logical-to-physical translation (LPT) table 900, which can be stored in the associated flash controller memory 142. As mentioned above, an LPT table, such as LPT table 900, can also be configured to store compressed page sizes of data pages stored in NAND flash memory systems 150 to aid in data deduplication.

Flash management code running on the GPP 132 tracks erased blocks of NAND flash memory system 150 that are ready to be used in ready-to-use (RTU) queues 906, which may be stored, for example, in GPP memory 134. In the depicted embodiment, management code running on the GPP 132 preferably maintains one or more RTU queues 906 per channel, and an identifier of each erased block that is to be reused is enqueued in one of RTU queues 906 corresponding to its channel. For example, in one embodiment, RTU queues 906 include, for each channel, a respective RTU queue 906 for each of a plurality of block health grades. In various implementations, between 2 and 8 RTU queues 906 per lane (and a corresponding number of block health grades) have been found to be sufficient.

A build block stripes function 920 performed by flash management code running on GPP 132 constructs new block stripes for storing data and associated parity information from the erased blocks enqueued in RTU queues 906. As noted above with reference to FIG. 6A, block stripes are preferably formed of blocks of the same or similar health (i.e., expected remaining useful life) residing in different channels, meaning that build block stripes function 920 can conveniently construct a block stripe by drawing each block of the new block stripe from corresponding RTU queues 906 of different channels. The new block stripe is then queued to flash controller 140 for data placement.

In response to a write IOP received from a host, such as a processor system 102, a data placement function 910 of flash controller 140 determines by reference to LPT table 900 whether the target LBA(s) indicated in the write request is/are currently mapped to physical memory page(s) in NAND flash memory system 150 and, if so, changes the status of each data page currently associated with a target LBA to indicate that it is no longer valid. In addition, data placement function 910 allocates a page stripe if necessary to store the write data of the write IOP and any non-updated data (i.e., in case the write request is smaller than a logical page, there is still valid data which needs to be handled in a read-modify-write manner) from an existing page stripe, if any, targeted by the write IOP, and/or stores the write data of the write IOP and any non-updated (i.e., still valid) data from an existing page stripe, if any, targeted by the write IOP to an already allocated page stripe which has free space left. The page stripe may be allocated from either a block stripe already allocated to hold data or from a new block stripe built by build block stripes function 920. In one embodiment, the page stripe allocation is based on the health of the blocks available for allocation and the "heat" (i.e., estimated or measured write access frequency) of the LBA of the write data. Data placement function 910 then writes the write data, associated metadata (e.g., CRC and ECC values), for each codeword in each page of the page stripe, and parity information for the page stripe in the allocated page stripe. The associated metadata and parity information can be written to storage as soon as enough host data has been placed into the page stripe. Flash controller 140 also updates LPT table 900 to associate the physical page(s) utilized to store the write data with the LBA(s) indicated by the host device. Thereafter, flash controller 140 can access the data to service host read IOPs by reference to LPT table 900 as further illustrated in FIG. 9.

Once all pages in a block stripe have been written, flash controller 140 places the block stripe into one of occupied block queues 902, which flash management code running on GPP 132 utilizes to facilitate garbage collection. As noted above, through the write process, pages are invalidated, and therefore portions of NAND flash memory system 150 become unused. An associated flash controller 140 (and/or GPP 132) eventually needs to reclaim this space through garbage collection performed by a garbage collector 912. Garbage collector 912 selects particular block stripes for garbage collection based on a number of factors including, for example, the health of the blocks within the block stripes and how much of the data within the erase blocks is invalid. In the illustrated example, garbage collection is performed on entire block stripes, and flash management code running on GPP 132 logs the block stripes ready to be recycled in a relocation queue 904, which can conveniently be implemented in the associated flash controller memory 142 or GPP memory 134.

The flash management functions performed by GPP 132 or flash controller 140 additionally include a relocation function 914 that relocates the still valid data held in block stripes enqueued in relocation queue 904. To relocate such data, relocation function 914 issues relocation write requests to data placement function 910 to request that the data of the old block stripe be written to a new block stripe in NAND flash memory system 150. In addition, relocation function 914 updates LPT table 900 to remove the current association between the logical and physical addresses of the data. Once all still valid data has been moved from the old block stripe, the old block stripe is passed to dissolve block stripes function 916, which decomposes the old block stripe into its constituent blocks, thus disassociating the blocks. Flash controller 140 then erases each of the blocks formerly forming the dissolved block stripe and increments an associated program/erase (P/E) cycle count for the block in P/E cycle counts 944. Based on the health metrics of each erased block, each erased block is either retired (i.e., no longer used to store user data) by a block retirement function 918 among the flash management functions executed on GPP 132, or alternatively, prepared for reuse by placing the block's identifier on an appropriate ready-to-use (RTU) queue 906 in associated GPP memory 134.

Figure 9:
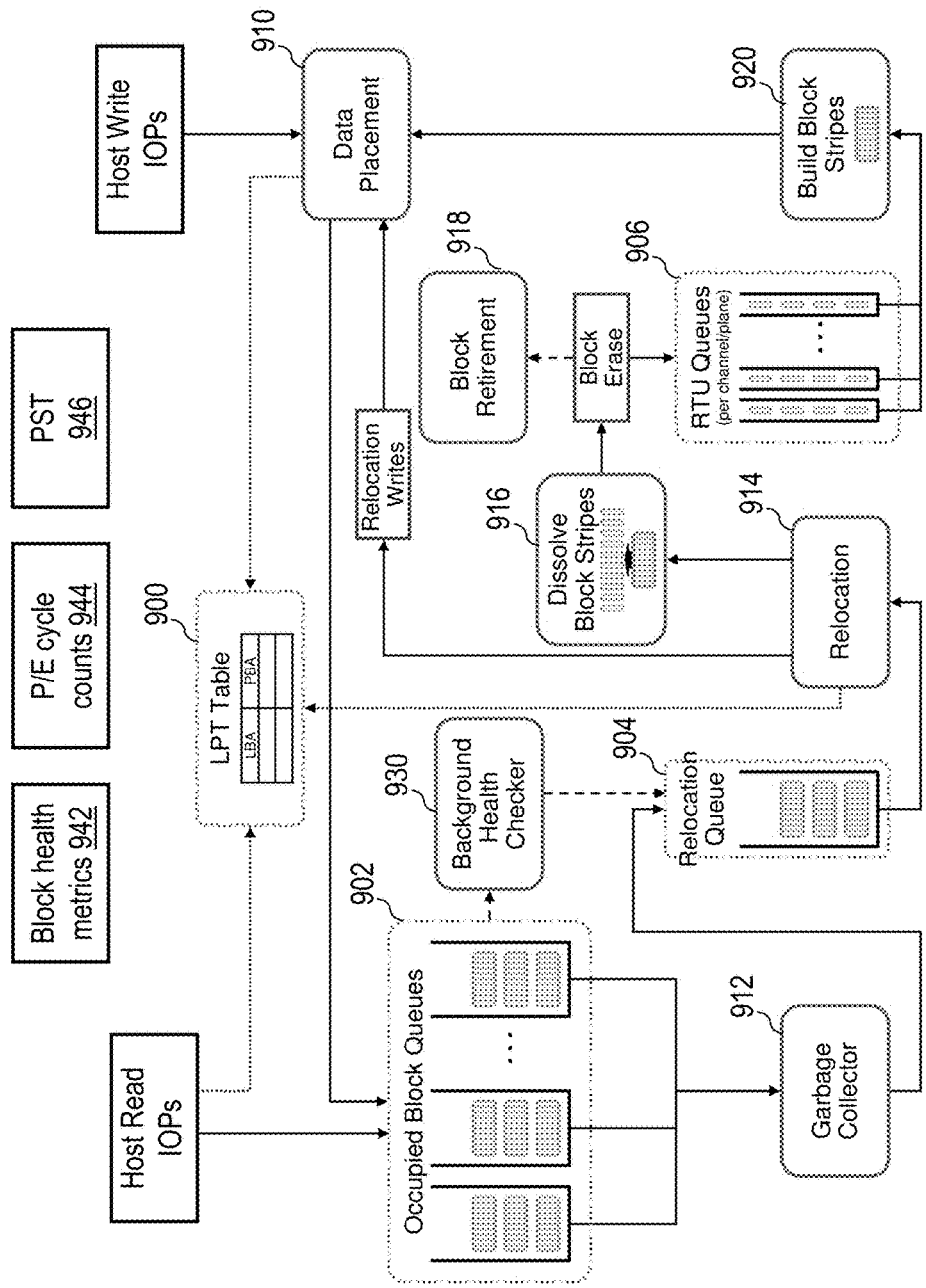
FIG. 9 is a high level flow diagram of the flash management functions and data structures employed by a flash controller in accordance with one embodiment.

As further shown in FIG. 9, flash management functions executed on GPP 132 include a background health checker 930. Background health checker 930, which operates independently of the demand read and write IOPs of hosts such as processor systems 102, continuously determines one or more block health metrics 942 for blocks belonging to block stripes recorded in occupied block queues 902. Based on the one or more of block health metrics 942, background health checker 930 may place block stripes on relocation queue 904 for handling by relocation function 914.

Figure 10:
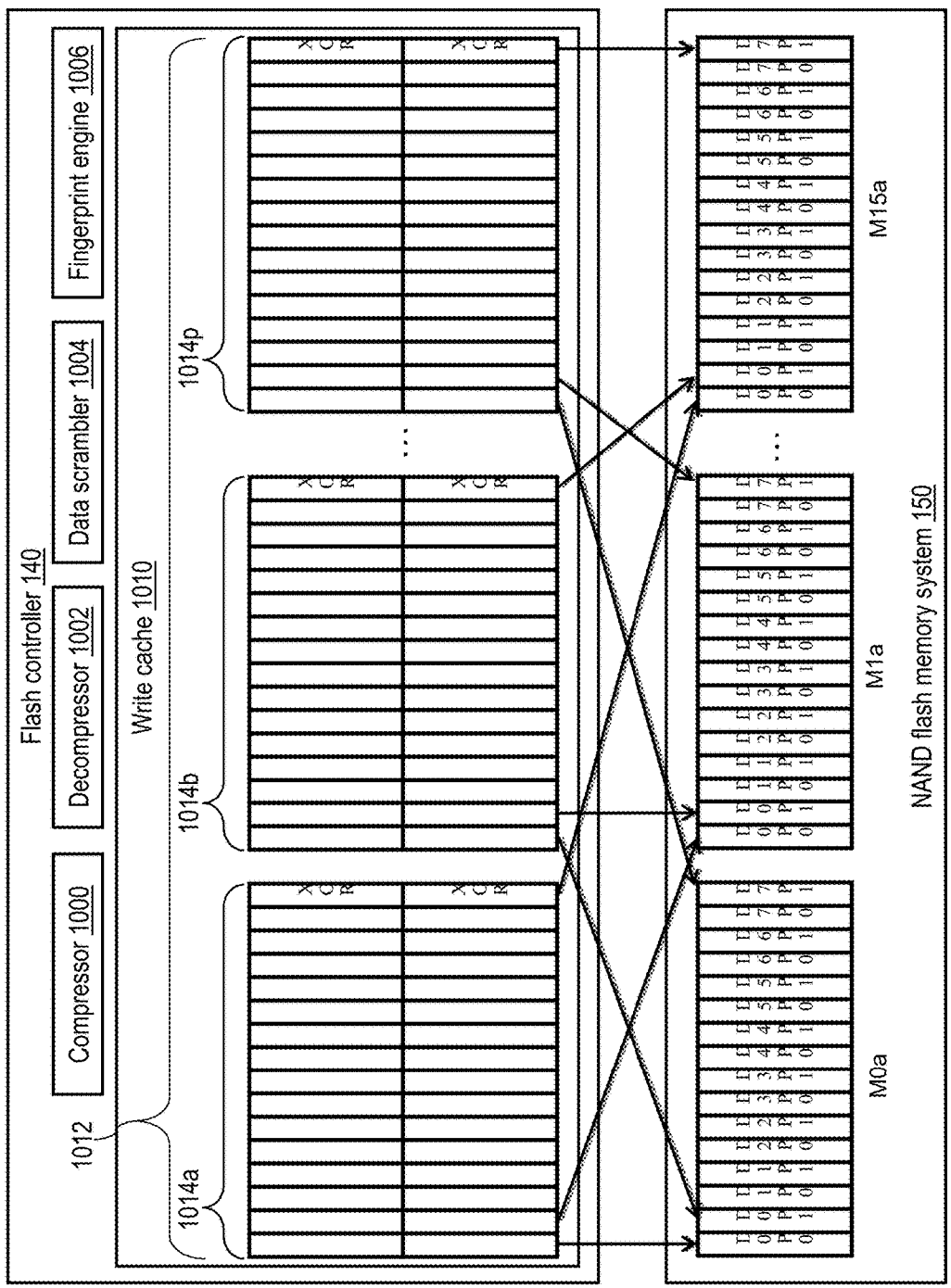
FIG. 10 depicts a more detailed view of an exemplary flash controller in accordance with one embodiment.

Referring now to FIG. 10, there is depicted a more detailed view of a flash controller 140 in accordance with one embodiment. In this embodiment, flash controller 140 is configured (e.g., in hardware, firmware, software or some combination thereof) to support retirement of memory in flash memory modules M0a, M0b, M1a, M1b, . . . , M1a, and M15b of a NAND flash memory system 150, for example, on a page-by-page basis rather than on a block-by-block basis, or a combination thereof. Flash controller 140 may be further configured to retire a physical page of memory while still keeping active other physical page(s) sharing a common set of multiple-bit memory cells with the retired physical page.

In the illustrated embodiment, flash controller 140 includes a compressor 1000 that selectively applies one or more data compression algorithms to data written to the associated NAND flash memory system 150, a decompressor 1002 that decompresses compressed data read from NAND flash memory system 150, and a data scrambler 1004. Flash controller 140 may also include an optional fingerprint engine 1006 similar to the fingerprint engine 118 in interface node 122. Flash controller 140 utilizes data scrambler 1004 to apply a predetermined data scrambling (i.e., randomization) pattern to data written to NAND flash memory 150 in order to improve endurance and mitigate cell-to-cell interference.

As further illustrated in FIG. 10, flash controller 140 includes a write cache 1010. Write cache 1010 includes storage for one or more cache lines 1012 for buffering write data in anticipation of writing the data to NAND flash memory system 150. In the illustrated embodiment, each cache line 1012 includes multiple (e.g., 16) segments 1014a-1014p, each providing storage for a respective page stripe of up to sixteen data pages (a maximum of fifteen data pages and one data protection page). As shown, for ease of implementation, it is preferred if flash controller 140 writes each page buffered in a given segment 1014 of cache line 1012 to the corresponding die index, plane index, and physical page index in each of sixteen flash memory modules. Thus, for example, flash controller 140 writes the data pages from segment 1014a to a first physical page (e.g., Page23) in each of flash memory modules M0a-M15a, writes the data pages from segment 1014b to a second physical page in each of flash memory modules M0a-M15a, and writes the data pages from segment 1014p to a sixteenth physical page in each of flash memory modules M0a-M15a.

A received data page (e.g., candidate duplicate page) may be compressed to determine a compressed page size of the given candidate duplicate page. Compressed page sizes for data pages stored in the data storage system may then be retrieved (e.g., from an LPT table). The size of the candidate duplicate page may then be compared to compressed page sizes of the stored data pages to determine if the size of the candidate duplicate page is equal to one or more of the compressed page sizes of the stored data pages. If none of the size values are the same, the stored data pages cannot be the same as the candidate duplicate page.

If the size of the candidate duplicate page is the same as the size of one or more of the stored data pages, CRC values of the stored data pages may be read from flash page metadata (MD) or from a data page. The read CRC values may then be adjusted to remove header information contributions, as well as data contributions from other data pages store in the same codeword. The adjusted CRC values may then be compared to the CRC value of the candidate duplicate page and if none of the CRC values match the CRC of the candidate duplicate page, the candidate duplicate page cannot be a duplicate data page. In the event one or more stored data pages have the same CRC value as the candidate duplicate page, a fingerprint for the one or more stored data pages with matching CRC values may then be compared to a fingerprint for the candidate duplicate page.

The calculation of the fingerprint can be executed by fingerprint engine 118 and the comparison can be performed by control plane GPP 113, data plane processor 117, or data plane GPP 116. Alternatively, fingerprint calculation and comparison may also be delegated to flash controller 140 if a fingerprint engine 1006 is available in Flash module 126A. In the event a fingerprint for the candidate duplicate page is the same as a fingerprint for one of the stored data pages, a data storage system may replace the received data page with a reference to a corresponding data page included in the one or more data pages stored in the storage system, and the candidate duplicate data page may be discarded (as the candidate duplicate page is a duplicate data page). In the event a fingerprint for the candidate duplicate page is not the same as a fingerprint for one of the stored data pages, the candidate duplicate data page is stored in the storage system (as the candidate duplicate page is not a duplicate data page). Depending on the availability of page size and CRC value, the disclosed tests can be readily adapted by changing the order of the checks.

According to various aspects of the present disclosure, an 'absolute expiration time' for each valid page within a block is taken into account by a garbage collector of a flash module in deciding whether the block should be selected for garbage collection. In one or more embodiments, the 'absolute expiration time' for each valid page in a block is considered in conjunction with free space on the block when determining whether the block should be garbage collected. For example, assuming a garbage collector is configured to move data from a block that has eighty percent free space, a determination is made as to which of the remaining twenty percent of valid data on the block are about to expire. Assuming that a threshold amount of valid pages within a block expire within a specified time frame, the block would be skipped until a later garbage collection window. Assuming that a threshold amount of valid pages in a block do not expire within a specified time frame, then the garbage collector copies valid pages of the block to another block and erases the block (i.e., the garbage collector performs garbage collection on the block).

Figure 12:
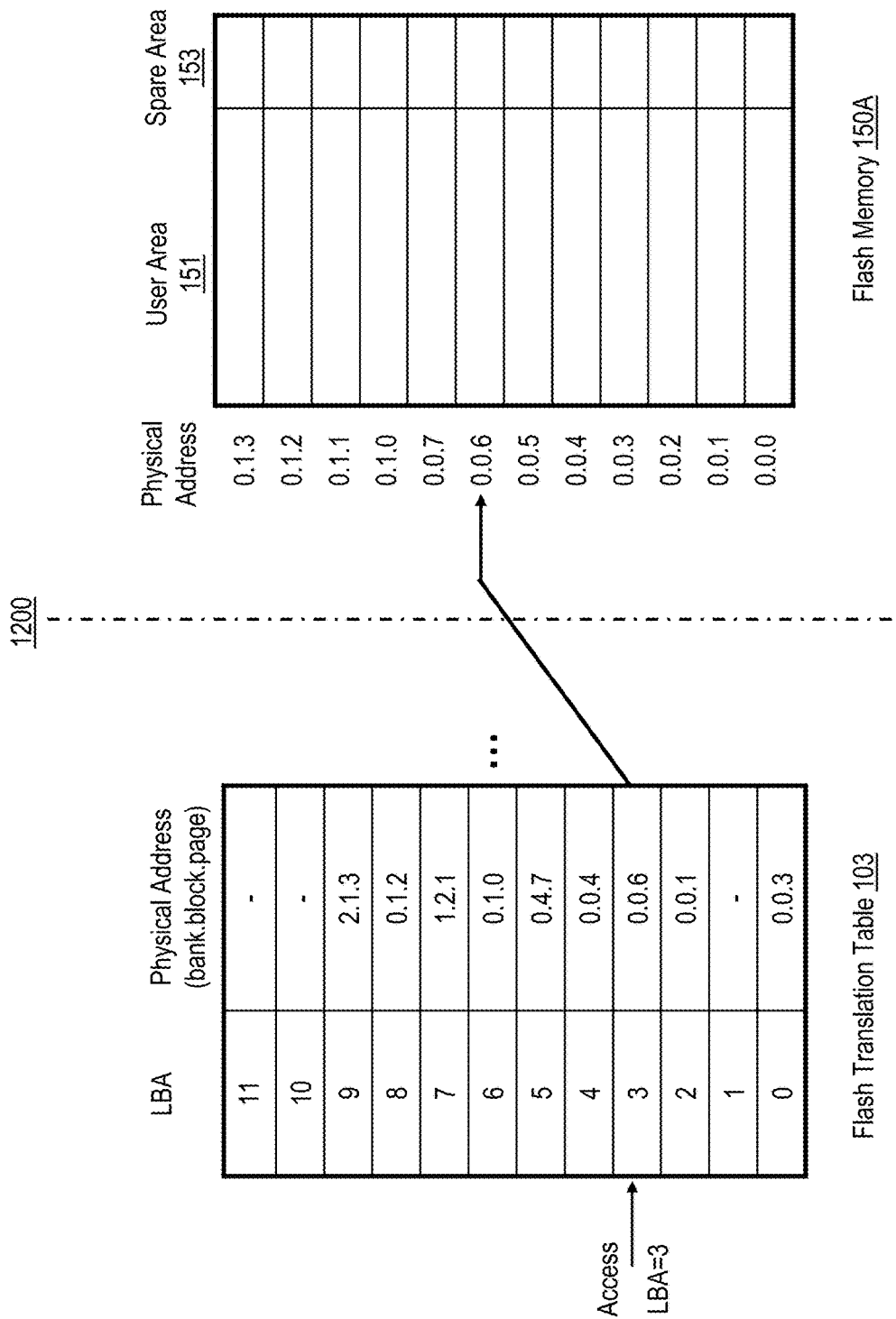
FIG. 12 depicts mapping from an entry in the FTT to an entry in flash memory according to one embodiment of the present disclosure.

With reference to FIG. 11, FTT 103 is further illustrated as including five fields for each LBA entry, the first three of which specify an associated physical address. That is, a first field specifies a memory bank, a second field specifies a block, and a third field specifies a page for an associated LBA entry. A fourth field specifies a creation time for data referenced by the LBA. A fifth field specifies an expiration time for data referenced by the LBA. An 'absolute expiration time' may be calculated based on values in the fourth and fifth fields. With reference to FIG. 12, a diagram 1200 illustrates how FTT 103 is utilized to reference a specific location in flash memory system 150. As is illustrated, an access with an LBA of three (LBA=3) is mapped to a physical address at memory bank zero, block zero, page six (i.e., PBA=0.0.6). Each physical address in flash memory system 150 has an associated user area 151 and an associated spare area 153. As previously mentioned, spare area may be used to store associated status information for each page in a flash memory. In one or more embodiments, status information for each page indicates an 'absolute expiration time' for the page, as well as indicating whether the page is 'live', 'dead', or 'free'.

With reference to FIG. 13, an exemplary process 1300 for handling longevity information in conjunction with a write IOP, according to the present disclosure, is illustrated. Process 1300 is initiated in block 1302, e.g., in response to data storage system 120 receiving an IOP. Process 1300 may, for example, be executed by data plane processor 117 of interface node 122. In decision block 1304 data plane processor 117 determines whether the received IOP is a write IOP. In response to the received IOP not being a write IOP (i.e., the received IOP is a read IOP) in block 1304 control transfers to block 1312, where process 1300 terminates. In response to the received IOP being a write IOP in block 1304 control transfers to block 1306.

In block 1306, data plane processor 117 stores longevity information associated with the write IOP in an appropriate entry in FTT 103. In one or more embodiments, the longevity information includes a 'creation time' and an 'expiration time' for data associated with the write IOP. Next, in block 1308, data plane processor 117 calculates an 'absolute expiration time' for the data associated with the write IOP based on the 'creation time' and the 'expiration time'. Then, in block 1310, data plane processor 117 transfers the data with the 'absolute expiration time' to an appropriate flash module 126A, which stores the data in conjunction with the 'absolute expiration time' in flash memory system 150. Following block 1310 control transfers to block 1312. As previously noted, the 'absolute expiration time' is used by a garbage collector when determining whether to garbage collect a block in flash memory system 150.

With reference to FIG. 14, an exemplary garbage collection process 1400 is illustrated that is implemented by garbage collector 912. Process 1400 is initiated in block 1402, e.g., periodically or in response to an event. Next, in decision block 1404 garbage collector 912 determines whether garbage collection on one or more erase blocks is warranted. As one example, garbage collection may be warranted when eighty percent of the pages within one or more candidate erase blocks are invalid and free, i.e., only twenty percent of the pages within the erase blocks are valid pages. When garbage collection is not warranted control transfers from block 1404 to block 1412, where process 1400 terminates. When garbage collection is warranted control transfers from block 1404 to block 1406. In block 1406, garbage collector 912 selects candidate blocks for garbage collection. For example, garbage collector 912 may select all erase blocks that have eighty percent or more free pages as candidate blocks for garbage collection.

Next, in block 1408, garbage collector 912 accesses the status for the valid pages in the candidate blocks, retrieving the 'absolute expiration time' for each of the valid pages. Then, in block 1410, garbage collector 912 selects blocks for garbage collection from the candidate blocks based on the absolute expiration time for the valid pages. As one example, garbage collection on a candidate block may be deferred when a threshold number of valid pages in the candidate block are due to expire prior to a next garbage collection window in order to reduce write amplification and wear on flash memory system 150. As another example, garbage collection on a candidate block may be initiated when a threshold number of valid pages in the candidate block are not due to expire prior to a next garbage collection window. Following block 1410 control transfers to block 1412.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As has been described, a controller of a non-volatile memory array retires physical pages within the non-volatile memory array on a page-by-page basis. The physical pages retired by the controller include a first physical page sharing a common set of memory cells with a second physical page. While the first physical page is retired, the controller retains the second physical page as an active physical page, writes dummy data to the first physical page, and writes data received from a host to the second physical page.

While the present invention has been particularly shown as described with reference to one or more preferred embodiments, it will be understood by those skilled in the art that various changes in form and detail may be made therein without departing from the spirit and scope of the invention. For example, although aspects have been described with respect to a data storage system including a flash controller that directs certain functions, it should be understood that present invention may alternatively be implemented as a program product including a storage device storing program code that can be processed by a processor to perform such functions or cause such functions to be performed. As employed herein, a "storage device" is specifically defined to include only statutory articles of manufacture and to exclude transmission media per se, transitory propagating signals per se, and forms of energy per se.

In addition, although embodiments have been described that include use of a NAND flash memory, it should be appreciated that embodiments of the present invention can also be used with other types of non-volatile random access memory (NVRAM) including, for example, phase-change memory (PCM) and combinations thereof.

The figures described above and the written description of specific structures and functions below are not presented to limit the scope of what Applicants have invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a" is not intended as limiting of the number of items.

What is claimed is:

1. A method of operating a data storage system, comprising:
   determining, by a controller of the data storage system, that two or more candidate storage blocks of the data storage system are candidates for garbage collection;
   accessing, by the controller, respective absolute expiration times for valid pages in the two or more candidate storage blocks;
   performing, by the controller, garbage collection on a first one of the candidate storage blocks that includes a first predetermined number of the valid pages that do not expire, as indicated by the absolute expiration times, prior to a first predetermined time period; and
   deferring until a subsequent garbage collection determination, by the controller, garbage collection on a second one of the candidate storage blocks that includes a second predetermined number of the valid pages that expire, as indicated by the absolute expiration times, prior to a second predetermined time period that is the same as or different than the first predetermined time period.

2. The method of claim 1, wherein the absolute expiration times are generated based on longevity information for a file that is created by an application.

3. The method of claim 2, wherein the longevity information includes an expiration time for a file.

4. The method of claim 3, wherein the longevity information includes a creation time for the file.

5. The method of claim 2, further comprising:
storing, by the controller, the longevity information in association with an entry in a flash translation table (FTT) that includes information for translating a logical block address (LBA) to a physical block address (PBA).

6. The method of claim 2, wherein the longevity information is derived from copyservices snapshot metadata.

7. The method of claim 2, wherein the file corresponds to a snapshot.

8. The method of claim 2, further comprising:
storing, by the controller, the absolute expiration times in association with the valid pages.

9. The method of claim 1, wherein the first predetermined number is the same as the second predetermined number and the first predetermined time period is the same as the second predetermined time period.

10. A data storage system, comprising:
one or more non-volatile memories; and
a controller coupled to the non-volatile memories, wherein the controller is configured to:
determine that two or more candidate storage blocks of the data storage system are candidates for garbage collection;
access respective absolute expiration times for valid pages in the two or more candidate storage blocks of the non-volatile memories;
perform garbage collection on a first one of the candidate storage blocks that includes a first predetermined number of the valid pages that do not expire, as indicated by the absolute expiration times, prior to a first predetermined time period; and
defer, until a subsequent garbage collection determination, garbage collection on a second one of the candidate storage blocks that includes a second predetermined number of the valid pages that expire, as indicated by the absolute expiration times, prior to a second predetermined time period that is the same as or different than the first predetermined time period.

11. The data storage system of claim 10, wherein the absolute expiration times are generated based on longevity information for a file that is created by an application.

12. The data storage system of claim 11, wherein the longevity information includes an expiration time for a file.

13. The data storage system of claim 12, wherein the longevity information includes a creation time for the file.

14. The data storage system of claim 11, further comprising:
storing, by the controller, the longevity information in association with an entry in a flash translation table (FTT) that includes information for translating a logical block address (LBA) to a physical block address (PBA).

15. The data storage system of claim 11, wherein the longevity information is derived from copyservices snapshot metadata.

16. The data storage system of claim 11, wherein the file corresponds to a snapshot.

17. The data storage system of claim 11, further comprising:
storing, by the controller, the absolute expiration times in association with the valid pages.

18. The data storage system of claim 10, wherein the first predetermined number is the same as the second predetermined number and the first predetermined time period is the same as the second predetermined time period.

19. A computer program product, the computer program product comprising a computer readable storage medium having program instructions embodied therewith, the program instructions executable by a controller, to cause the controller to:
determine that two or more candidate storage blocks of a data storage system are candidates for garbage collection;
access respective absolute expiration times for valid pages in the two or more candidate storage blocks of the non-volatile memories;
perform garbage collection on a first one of the candidate storage blocks that includes a first predetermined number of the valid pages that do not expire, as indicated by the absolute expiration times, prior to a first predetermined time period; and
defer, until a subsequent garbage collection determination, garbage collection on a second one of the candidate storage blocks that includes a second predetermined number of the valid pages that expire, as indicated by the absolute expiration times, prior to a second predetermined time period that is the same as or different than the first predetermined time period.

20. The computer program product of claim 19, wherein the absolute expiration times are generated based on longevity information for a file that is created by an application and the longevity information includes an expiration time for a file and a creation time for the file, and wherein the program instructions are further configured to cause the controller to:
store the longevity information in association with an entry in a flash translation table (FTT) that includes information for translating a logical block address (LBA) to a physical block address (PBA).

* * * * *